Figure 1:
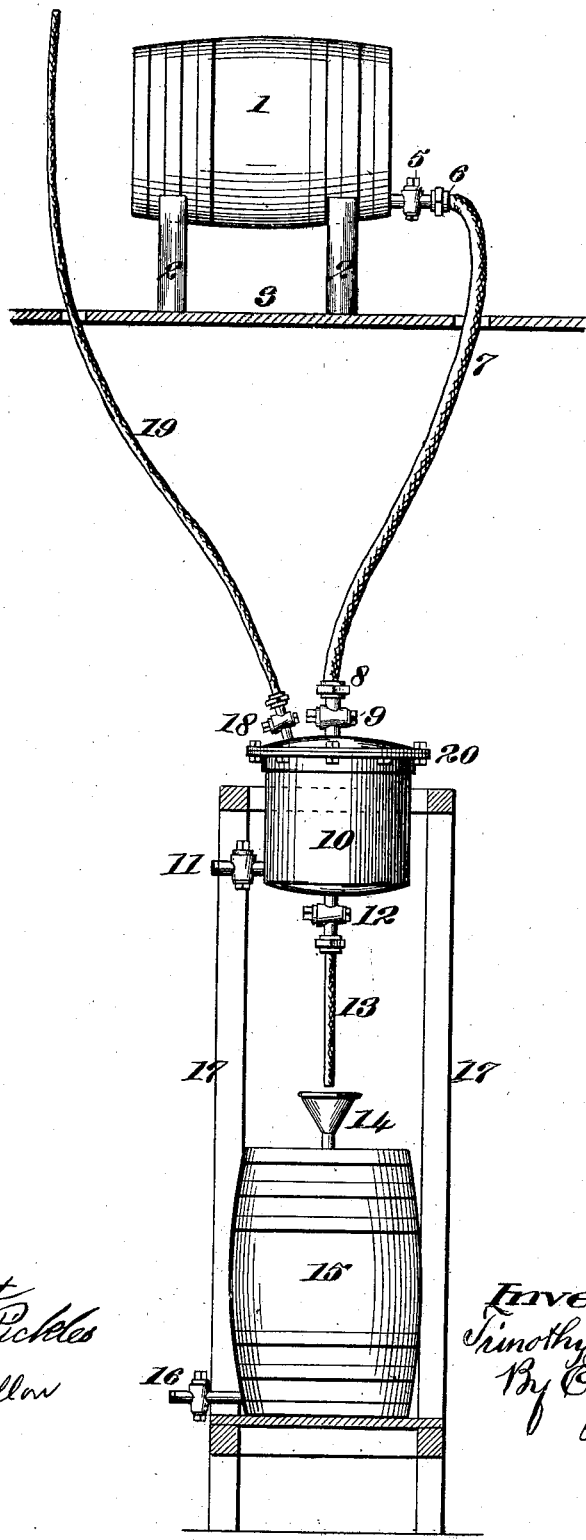

No. 733,726. PATENTED JULY 14, 1903.
T. W. MANNING.
CLARIFYING APPARATUS.
APPLICATION FILED FEB. 9, 1903.
NO MODEL. 2 SHEETS—SHEET 1.

Attest
Charles Pickles
Edw. L. Dillon

Inventor
Timothy W. Manning
By C. J. O'Brien
His Atty

No. 733,726. PATENTED JULY 14, 1903.
T. W. MANNING.
CLARIFYING APPARATUS.
APPLICATION FILED FEB. 9, 1903.
NO MODEL. 2 SHEETS—SHEET 2.
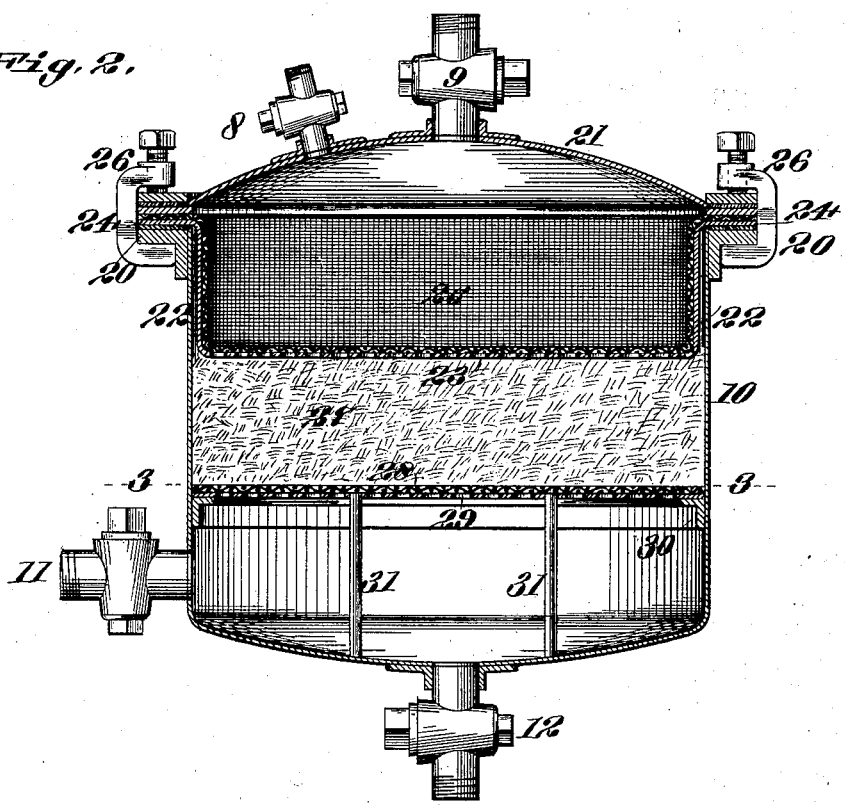
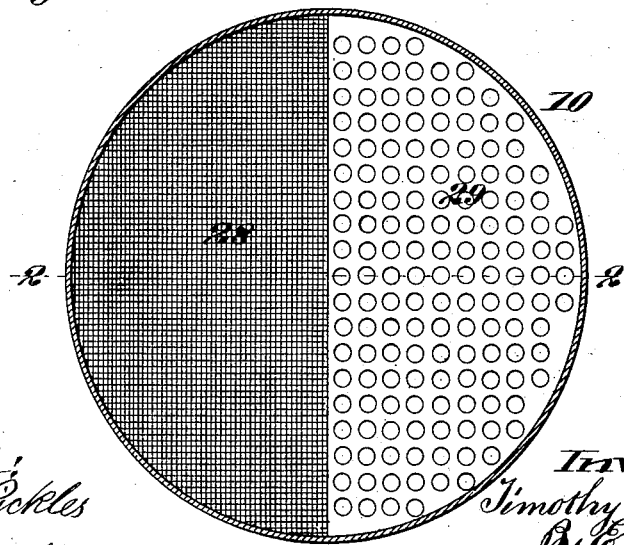
Attest:
Charles Pickles
Edw. L. Dillon
Inventor:
Timothy W. Manning
By E. J. O'Brien
His Atty No. 733,726. Patented July 14, 1903.

UNITED STATES PATENT OFFICE.

TIMOTHY W. MANNING, OF ST. LOUIS, MISSOURI.

CLARIFYING APPARATUS.

SPECIFICATION forming part of Letters Patent No. 733,726, dated July 14, 1903.

Application filed February 9, 1903. Serial No. 142,637. (No model.)

*To all whom it may concern:*

Be it known that I, TIMOTHY W. MANNING, a citizen of the United States, residing at the city of St. Louis, State of Missouri, have invented certain new and useful Improvements in Clarifying Apparatus; and I do declare the following to be a full, clear, and exact description of my invention, such as will enable others skilled in the art to make and use the same.

My invention relates to improvements in clarifiers used in cleaning and clarifying or brightening spirituous, vinous, and malt liquors, and is arranged and adapted so as to perform the operation of cleaning and clarifying such articles rapidly and on a large scale.

The objects of my invention are: first, to provide a simple and efficient apparatus whereby said liquids may be cleared and brightened by drawing off the liquid to be cleared through a pipe or pipes from a barrel or tank elevated above a receiving barrel or tank and having the clarifying apparatus in communication with and located between the supply and receiving vessel, so that a force of gravity will afford the power and means necessary to pass the liquid through a substantial bed of clear paper-pulp or like fiber; second, to remove motes and foreign particles in the liquid, and, third, to provide means to secure a continuous flow of clarified liquid from the supply to the receiving vessels; and my invention consists in a novel construction and arrangement of parts and devices, as herein shown and described, and particularly pointed out in the claim.

In the accompanying drawings, forming part of this specification, similar figures of reference denote similar parts throughout the several views.

Figure I is a view in elevation of my improved clarifying apparatus, showing the general location and arrangement of the supply barrel or holder, the filtering and clarifying tank, and receiving barrel or holder, together with their framework and supports and necessary piping and connection; Fig. II, a vertical section between the filtering and clarifying tank on line 2 2 of Fig. III, showing its arrangement, parts, and connection; and Fig. III, a horizontal section showing the perforated form of bottom used in upper tray and middle packing-compartments with a portion covered by a filtering-cloth and taken on line 3 3, Fig. II.

In the drawings, 1 represents a barrel or holder containing the liquid to be cleansed and clarified; 2, the supporting-platform for the supply-barrel; 3, the floor-support for same; 5, the discharge-faucet to supply-barrel; 6, the coupling thereto; 7, pipe to convey liquid to filter and clarifier; 8, lower coupling to supply-pipe; 9, its discharge-faucet; 10, the body of filtering and clarifying tank; 11, discharge-faucet at the side of the filter and clarifier which communicates with the lower compartment thereof, whereby the apparatus may be used dispensing with receiving-barrel, if required; 12, discharge-faucet in bottom of filter and clarifying tank, also communicating with its bottom compartment; 13, pipe connected to same; 14, funnel for conducting clarified liquid from pipe 13; 15, the receiving barrel or holder; 16, discharge-faucet to receiver; 17, supporting-frame of filter and clarifying tank and receiving barrel or holder; 18, faucet for vent-pipe of filter and clarifying tank; 19, the vent or air pipe thereto with open end above level of supply-holder; 20, annular flanged rim of body of filter and clarifying tank, provided with round holes matching with similar openings and flanged rim of inner top tray, top of tank, and packing-gromet, whereby the apparatus is secured for the desired operation; 21, cover or top of filter and clarifying tank; 22, annular inner tray or basket, fitting in the upper part of the body of the filter and clarifying tank, having a perforated bottom and punched and flanged rim and constituting an upper compartment of said tank; 23, perforated bottom of said tray; 24, punched annular gromet or ring; 25, filtering-cloth or lining to annular tray 22; 26, clamp for fastening the top parts of tank secured to it or loosening same; 27, bed of paper-pulp, 28, retaining cloth lining over bottom to middle pulp-containing section; 29, perforated diaphragm forming bottom of pulp-holding section; 30, angle-iron supporting parts for discharge 29; 31, stanchions to prevent diaphragm from sagging under unusual pressure.

Having set up the apparatus herein as described, and shown by the drawings, its operation is as follows, viz: The supply-barrel being at its elevated position, open the faucets 9 and 5 to the supply-pipe 7, also open the air-pipe at its faucet 18, and the liquid flows downward into the middle filter and clarifying tank 10, where it is deprived by the filter-cloth lining to the tray therein of any motes or foreign particles which it might carry with it, thence passing to the bed of paper-pulp contained in and occupying the space of the middle section of the filter and clarifying tank, it is forced through that packing and section of tank, which operation brings about a comminution of the liquid in its passage through the pulp, rendering it brilliant and clear as it passes into the lower section of the filter and clarifying tank, from which, as I have shown, it may be drawn off either at the side of the tank or discharged through its bottom into a receiving barrel or holder, and from thence transferred to bottles, jugs, barrels, or any other desired package fit for the market.

Having thus described my invention, that which I claim as new, and desire to secure by Letters Patent, is—

In a clarifying apparatus, the combination with and between the respective supply and receiving holders, of a filter and clarifying tank, comprising an outer shell with flanged rim having a removable top secured thereto and having supply and discharge inlets at its upper and lower parts, an air-pipe, an inner removable tray provided with a flanged top and perforated bottom, and having a lining of filter-cloth, and extending inside of the outer tank forming an upper compartment therein; a perforated diaphragm, located approximately the same depth below the bottom of tray as latter is from top of tank, forming a middle compartment therein; the packing of said middle chamber with paper-pulp material resting on a strainer-cloth over the perforated diaphragm and a lower receiving-compartment for clarified liquor all substantially as shown and described and for the purposes specified.

TIMOTHY W. MANNING.

Witnesses:
   AUG. REBENACK,
   E. J. O'BRIEN.